(12) United States Patent
Schmidt et al.

(10) Patent No.: US 10,967,898 B2
(45) Date of Patent: Apr. 6, 2021

(54) MOTOR-ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventors: René Marco Schmidt, Lienz (CH); Samuel Gomez Redondo, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 167 days.

(21) Appl. No.: 16/470,827

(22) PCT Filed: Jan. 8, 2018

(86) PCT No.: PCT/EP2018/050373
§ 371 (c)(1),
(2) Date: Jun. 18, 2019

(87) PCT Pub. No.: WO2018/127590
PCT Pub. Date: Jul. 12, 2018

(65) Prior Publication Data
US 2019/0308654 A1   Oct. 10, 2019

(30) Foreign Application Priority Data
Jan. 9, 2017 (DE) ............. 10 2017 200 213.1

(51) Int. Cl.
*B62D 1/18* (2006.01)
*B62D 1/181* (2006.01)
(Continued)

(52) U.S. Cl.
CPC ............. *B62D 1/181* (2013.01); *B62D 1/185* (2013.01); *B62D 1/189* (2013.01); *F16C 29/02* (2013.01); *F16C 29/123* (2013.01)

(58) Field of Classification Search
CPC ........ B62D 1/189; B62D 1/185; B62D 1/181; F16C 29/02; F16C 29/123
(Continued)

(56) References Cited

U.S. PATENT DOCUMENTS 5,419,215 A    5/1995  Herron
6,390,505 B1*  5/2002  Wilson .................. B62D 1/181
                                              280/775

(Continued)

FOREIGN PATENT DOCUMENTS

CN    102256858 A    11/2011
CN    204222957 U     3/2015
(Continued)

OTHER PUBLICATIONS

English Translation of International Search Report issued in PCT/EP2018/050373, dated Mar. 20, 2018.

*Primary Examiner* — Toan C To
(74) *Attorney, Agent, or Firm* — thyssenkrupp North America, LLC

(57) ABSTRACT

A motor-adjustable steering column for a motor vehicle, includes a support unit, which can be mounted on a vehicle body, and by which an actuator unit is held, in which a steering spindle is rotatably mounted about a longitudinal axis. An adjusting drive is connected to the support unit and to the actuator unit, and by which the actuator unit can be adjusted relative to the support unit. The adjusting drive includes a drive unit and a threaded spindle engaging in a spindle nut with a threaded spindle axis, wherein the threaded spindle can be driven in rotation or in translation by the drive unit. The drive unit is connected to a component of the steering column such that it is movable in a transverse direction transversely to the threaded spindle axis.

17 Claims, 4 Drawing Sheets

(51) Int. Cl.
   *B62D 1/185* (2006.01)
   *B62D 1/189* (2006.01)
   *F16C 29/02* (2006.01)
   *F16C 29/12* (2006.01)

(58) Field of Classification Search
   USPC .................................................. 74/492, 493
   See application file for complete search history.

(56) References Cited

U.S. PATENT DOCUMENTS

| | | | | |
|---|---|---|---|---|
| 6,711,965 | B2* | 3/2004 | Tomaru | B62D 1/181 |
| | | | | 280/775 |
| 8,161,839 | B2* | 4/2012 | Warashina | B62D 1/181 |
| | | | | 74/493 |
| 8,844,400 | B2* | 9/2014 | Morinaga | B62D 1/181 |
| | | | | 74/495 |
| 8,910,976 | B2* | 12/2014 | Toyoda | B62D 1/181 |
| | | | | 280/775 |
| 8,967,016 | B2* | 3/2015 | Uesaka | F16C 35/02 |
| | | | | 74/493 |
| 9,260,130 | B2* | 2/2016 | Mizuno | B62D 1/181 |
| 10,654,510 | B2* | 5/2020 | Inoue | B62D 1/181 |
| 2004/0023746 | A1 | 2/2004 | Arihara | |
| 2007/0180945 | A1 | 8/2007 | Tomaru | |
| 2011/0314954 | A1* | 12/2011 | Matsuno | B62D 1/181 |
| | | | | 74/493 |
| 2012/0247259 | A1* | 10/2012 | Mizuno | B62D 1/181 |
| | | | | 74/493 |
| 2013/0233117 | A1 | 9/2013 | Read | |
| 2016/0252133 | A1 | 9/2016 | Caverly | |

FOREIGN PATENT DOCUMENTS

| | | |
|---|---|---|
| CN | 104640758 A | 5/2015 |
| DE | 10 2012 112 197 | 6/2014 |
| DE | 102014104362 A | 10/2015 |
| EP | 2 822 835 B | 7/2016 |

\* cited by examiner

MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2018/050373, filed Jan. 8, 2018, which claims priority to German Patent Application No. DE 10 2017 200 213.1, filed Jan. 9, 2017, the entire contents of both of which are incorporated herein by reference.

FIELD

The present disclosure generally relates to a motor-adjustable steering column for a motor vehicle.

BACKGROUND

Steering columns for motor vehicles comprise a steering shaft with a steering spindle, on whose rear end, in the driving direction, facing toward the driver, there is mounted a steering wheel for effectuating a steering command by the driver. The steering spindle is mounted rotatably about its longitudinal axis in an actuator unit, which is held adjustably by a support unit. The movement of the actuator unit enables on the one hand an adjustment of an ergonomically comfortable steering wheel position relative to the driver's position in the operating condition, also known as the driving or operating position, in which manual steering can be performed.

It is known in the prior art to provide a motorized adjusting drive with a drive unit for the adjustment of the actuator unit relative to the support unit, which drive unit generally comprises an electrical servomotor which is connected by a gearing to a spindle drive. At the power takeoff side of the drive unit, which is connected in fixed manner to the actuator unit or the support unit, there is coupled a threaded spindle, which can be rotationally driven about its threaded spindle axis or displaced in translation along this threaded spindle axis. The rotationally driven threaded spindle of a first embodiment engages with a spindle nut, which is mounted in a fixed manner on the actuator unit with respect to the threaded spindle axis, or in a second, alternative embodiment of the translationally movable threaded spindle the threaded spindle engages with a spindle nut, wherein the threaded spindle is coupled nonrotatably with the actuator unit and the threaded spindle can be displaced in translation by the rotation of the spindle nut by means of the electrical servomotor in the direction of the threaded spindle axis and the movement of the actuator unit is realized in this way. The spindle drive forms a motorized adjusting drive operating between the support unit and the actuator unit and by which the actuator unit can be adjusted for the adjustment relative to the support unit.

The greatest possible rigidity and the highest eigenfrequency of the adjustment assembly formed by the support unit and the actuator unit can be realized in that the actuator unit is force-guided by the support unit with little play. While the arrangement of the threaded spindle of the adjusting drive between the support unit and the actuator unit allows an adjusting force to be applied, it results in a mechanically overdetermined system. Even slight deviations from an exact arrangement will result in constrained states, in which undesired transverse forces occur in the spindle drive and in the bearings. Such constrained states, which lead to less quiet running and increased wear, are unavoidable, even when allowing for the usually occurring manufacturing tolerances.

In order to balance out manufacturing tolerances, the prior art in US 2016/0252133 A1 describes clamping the actuator unit inside a casing unit in spring-loaded manner transversely to the longitudinal axis, the casing unit being carried by a support unit. In this way, the actuator unit can move transversely to the longitudinal axis during the adjustment in the longitudinal direction, and thereby equalize any angle errors occurring between the threaded spindle axis of the threaded spindle and the longitudinal axis. While this reduces possible constraining forces, it is an unavoidable drawback that the rigidity and the eigenfrequency of the telescopic assembly formed from actuator unit and casing unit are decreased in unacceptable manner.

Thus a need exists for a steering column with an improved adjusting drive, which ensures the greatest possible rigidity with low tolerance requirements.

DETAILED DESCRIPTION

Figure 1:
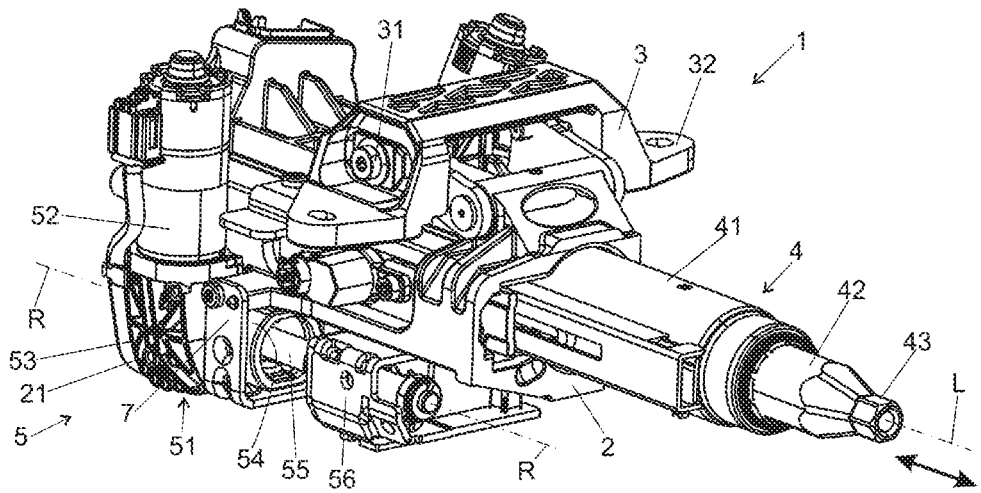
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

The invention relates to a motor-adjustable steering column for a motor vehicle, including a support unit, which can be mounted on a vehicle body, and by which an actuator unit is held, in which a steering spindle is rotatably mounted about a longitudinal axis, and having an adjusting drive, which is connected to the support unit and to the actuator unit, wherein the adjusting drive includes a drive unit and a threaded spindle engaging in a spindle nut and having a threaded spindle axis, wherein the threaded spindle can be driven in rotation or in translation by the drive unit.

According to the invention, it is proposed for a steering column of this kind with the aforementioned features that the drive unit is connected to a component of the steering column such that it is movable in a transverse direction transversely to the threaded spindle axis.

According to the invention, it is proposed for a steering column of this kind with the aforementioned features that, alternatively or additionally, the drive unit is connected to a component of the steering column which is formed by the support unit, the actuator unit or a casing unit holding the actuator unit and connected to the support unit, such that it can swivel about an axis lying in a transverse direction.

The component of the steering column to which the drive unit is connected may be the support unit or a casing unit or the actuator unit.

For the realization of the solution according to the invention for a telescopic adjustment, a motor-adjustable steering column for a motor vehicle is proposed, comprising a casing unit, which is mounted on a support unit connectible to a vehicle body, and by which an actuator unit is held, in which a steering spindle is rotatably mounted about a longitudinal axis, and having an adjusting drive, which is connected to the casing unit and to the actuator unit, and by which the actuator unit can be axially extended and retracted in telescopic manner relative to the casing unit with respect to the longitudinal axis, wherein the adjusting drive comprises a drive unit connected to the casing unit and a threaded spindle engaging in a spindle nut and having a threaded spindle axis, wherein the threaded spindle can be driven in rotation or in translation by the drive unit.

According to the invention, the drive unit is connected to a component, the casing unit, such that it can move in a transverse direction transversely to the threaded spindle axis.

The adjusting drive, according to the preamble of patent claim 1, is thus connected to the support unit, with interpositioning of the casing unit, wherein the relative adjustment of the actuator unit with respect to the casing unit constitutes at the same time a relative adjustment of the actuator unit with respect to the support unit. As the realization of the telescopic adjustment shows, it can be provided that further components, such as a casing unit, are arranged between the actuator unit and the support unit. Furthermore, even more casing units may be provided to constitute a compound telescope in the form of multiple casing tubes.

The drive unit, according to the invention, is variably positionable relative to the casing unit or to the support unit, and thus relative to the actuator unit mounted therein with little play, and this transversely to the threaded spindle axis, which dictates the adjustment direction of the telescopic adjustment. Preferably, the drive unit is displaceable in linear manner substantially transversely to the threaded spindle axis and transversely to the longitudinal axis. In this way, an additional degree of freedom is realized for the relative movement between the threaded spindle of the drive unit and the spindle nut mounted on the actuator unit or the threaded spindle connected to the actuator unit. Since the drive unit can move together with the rotatable threaded spindle or together with the rotatable spindle nut toward the actuator unit or away from the actuator unit, deviations from the parallel orientation of the threaded spindle axis of the threaded spindle to the longitudinal axis of the steering spindle caused by component and manufacturing tolerances can be balanced out. In particular, the movement of the drive unit can compensate for wrong positions of the threaded spindle relative to the coupling with the actuator unit.

Alternatively or additionally to the linear displaceability transversely to the threaded spindle axis and transversely to the longitudinal axis, the drive unit the drive unit can be connected to a component of the steering column, which is formed by the support unit, the actuator unit or a casing unit holding the actuator unit and connected to the support unit, such that it can swivel about an axis lying in the transverse direction. In this way, the threaded spindle axis can be tilted or swiveled relative to the longitudinal axis to compensate for deformations relative to the support unit, actuator unit or casing unit that are produced by manufacturing tolerances and by constraining forces acting during operation. Swivelability about an axis lying in the transverse direction and a linear mobility in the transverse direction may be realized individually or in combination, depending on the requirements.

For the realization of the solution according to the invention for a height adjustment, a motor-adjustable steering column for a motor vehicle is proposed, comprising a casing unit, which is mounted on a support unit connectible to a vehicle body, and by which a steering spindle is carried rotatably about a longitudinal axis, and having an adjusting drive, which is connected to the casing unit and to the support unit, and by which the casing unit can swivel relative to the support unit, wherein the adjusting drive comprises a drive unit connected to the casing unit and a threaded spindle engaging in a spindle nut and having a threaded spindle axis, wherein the threaded spindle can be driven in rotation or in translation by the drive unit. According to the invention, the drive unit is connected to a component, the support unit, such that it can move in a transverse direction transversely to the threaded spindle axis.

The adjusting drive is thus connected to the support unit, wherein the relative adjustment in the form of a swiveling of the casing unit with respect to the support unit at the same time constitutes a relative adjustment of the actuator unit received in the casing unit with respect to the support unit. As the realization of the swivel adjustment (height adjustment) shows, it may be provided that further components, such as a casing unit, are arranged between the actuator unit and the support unit. Furthermore, still further casing units may be provided to constitute a compound telescope.

In operation, the drive unit can be deflected by the transverse forces acting between the threaded spindle and the spindle nut on account of a possible wrong positioning so far in the transverse direction that the threaded spindle engages in coaxially oriented manner in the spindle nut. This increases the quiet running of the adjustment drive and reduces wear.

The movable mounting according to the invention can be realized in that the drive unit comprises a bearing segment, which is mounted in a sliding bearing. The sliding bearing may have a guiding device, in which the drive device is held and can be displaced in linear manner in the transverse direction relative to the threaded spindle axis, for example in the form of a linear plain bearing. The drive unit may be received in the guiding device with a bearing segment, which is designed to be mounted movably in the sliding bearing in the transverse direction. For example, the bearing segment may have sliding surfaces which can slide along corresponding bearing surfaces of the sliding bearing transversely to the threaded spindle axis, and this in the direction of the component to which the drive unit is connected, for example the casing unit or the support unit, toward or away from it. The sliding surfaces may also be arranged on opposite sides of the bearing segment, so that the bearing segment is forcibly guided between opposite bearing surfaces of the sliding bearing in the manner of a slot guide. In this way, the drive unit is held in position in the direction of the threaded spindle axis, i.e., transversely to the transverse direction, which increases the rigidity of the arrangement and reduces vibrations during operation.

One advantageous embodiment of the invention provides that the drive unit is spring-loaded by at least one spring element in the transverse direction. At least one spring element is arranged such that it is braced against the component to which the drive unit is connected, for example the casing unit or the support unit, or an abutment connected to the component, and exerts a spring force on the drive unit in the direction of its mobility according to the invention, transversely to the threaded spindle axis. The drive unit may be spring-loaded by at least one spring element for example in the direction of the longitudinal axis, i.e., from the outside against the component, such as the casing unit or the actuator unit received therein or the support unit. If, on account of the mentioned component and manufacturing tolerances, a displacement of the spindle nut fastened to the actuator unit or of the threaded spindle fastened to the latter occurs with respect to the threaded spindle axis in the transverse direction, i.e., radially outward, during the adjustment of the actuator unit, the threaded spindle and along with it the drive unit is moved outward against the inwardly directed spring force likewise in the transverse direction. As a result of the spring pretensioning, the drive unit is held and supported elastically in the transverse direction, so that noise production and vibrations during operation are reliably suppressed. The spring element or elements may engage for example with a bearing segment, which is mounted transversely movably in a sliding bearing as described above.

It may likewise be advantageous for the drive unit to be clamped in resilient manner between two spring elements. The one spring element acts—as described above—from the outside in the direction of the longitudinal axis, and the second spring element exerts a spring force opposite the first spring element on the drive unit. For this, the second spring element may be installed, looking outward from the longitudinal axis, between the component, such as the casing unit or the support unit, and the drive unit, so that it is braced outwardly against the component, for example against the casing unit or against the support unit, and exerts a spring force directed outwardly in the transverse direction against a bearing segment of the drive unit. In this arrangement, the drive unit is held in a middle position between the spring elements acting against each other, and it can move in both directions transversely to the threaded spindle axis in order to equalize tolerance-related wrong orientations both toward the component to which the drive unit is connected and away from it. In this way, any conceivable constrained states can be reliably avoided.

A holding element may be arranged on the component, such as the casing unit or the support unit, against which the drive unit is braced at least in the transverse direction. The holding element may for example be configured in the form of a holding bracket, which encloses the drive unit from the outside, for example a bearing segment of the drive unit, so that the drive unit is braced in the transverse direction. In this way, the drive unit is fixed from the outside on the component, for example the casing unit or the support unit, and the mobility according to the invention of the drive unit in the transverse direction can be bounded toward the outside by the holding element. Furthermore, a spring force may be exerted in the transverse direction inwardly in the direction of the mobility according to the invention toward the longitudinal axis by the holding element.

The holding element may be designed integrally with the component to which the drive unit is connected, for example the casing unit or the support unit. One advantageous embodiment provides that the holding element is designed as a holding bracket, which is attached by means of fastening elements to the component. In this way, the mounting of the drive unit on the component can be facilitated.

In order to realize the above-described spring loading, at least one spring element can be arranged between the holding element and the drive unit and/or between the drive unit and the component. As a result of a spring element installed between the holding element in the area in which it encloses the drive unit on the outside with respect to the longitudinal axis, for example on a bearing segment, and the drive unit, a spring force can be exerted which presses the drive unit from the outside transversely against the casing unit, i.e., pretensions it. The spring element may accordingly be designed as a compression spring, which is braced by one end against an abutment on the holding bracket, and by the other end against the drive unit, for example in the area of a bearing segment. In this way it is already possible to realize a one-sided pretensioning of the threaded spindle connected to the drive unit in the transverse direction against the spindle nut connected to the actuator unit or the threaded spindle connected to the actuator unit. By arranging a second spring element between the opposite side of the drive unit, for example on the inner side of the bearing segment facing toward the longitudinal axis, and the outer side of the casing unit, the drive unit can be elastically clamped, as described above, between two spring elements in the transverse direction.

The holding element may have a bearing surface on which a bearing segment of the drive unit rests preferably by a slide surface and is thereby mounted and guided movably in the transverse direction. A corresponding bearing surface may be arranged opposite the bearing surface of the holding element on the component. The drive unit may be guided in transverse displacement between these two opposite bearing surfaces.

The spring element or elements may be configured for example as flat compression springs, for example as ring-shaped conical or hemispherical disk springs. In one preferred modification, multiple disk springs may be provided, which are arranged in a disk spring pack.

It is possible for the holding element to be configured as a spring-elastic holding bracket. Instead of a separate spring element, the holding element itself is elastic, for example by realizing a bending elastic leg or protrusion. With the elastic portion, the holding bracket can exert a spring force on the drive unit, for example as a pretensioning force transversely to the direction of the longitudinal axis. For this, the holding bracket can be made from an elastic material, such as spring steel. One advantage of the spring-elastic holding bracket is that a separate spring element is eliminated, thus simplifying the fabrication and assembly.

In combination with the resilient holding bracket, a second spring element may be arranged between the inner side of the drive unit, facing away from the holding bracket, and the oppositely situated outer side of the component, such as the casing unit or the support unit. In this way, the drive unit can be elastically clamped as described above for example between the two spring elements, being transversely displaceable in both directions.

One advantageous modification of the invention provides that the holding element comprises a projecting holding protrusion which engages with a holding recess of the drive unit. The holding protrusion may be configured preferably in the form of a holding pin, which extends from the holding element outwardly with respect to the component in the transverse direction against the drive unit, preferably against a bearing segment of the drive unit. The holding element may for example have a cylindrical or polygonal cross section, which engages with an outwardly open and corresponding holding opening or depression in the drive unit, for example in a bearing segment, in form-fitting manner or in a loose form fit, for example.

A similar holding protrusion may be arranged on the component of the steering column on the side opposite the holding element, which protrusion may likewise have the form of a holding pin, projecting outward from the casing unit. Said pin may likewise engage with a holding opening or depression of the drive unit.

As a result of the interaction of at least one holding protrusion and a corresponding holding recess or opening, the drive unit can be fixed in the longitudinal direction on the one component of the steering column, and the adjusting force exerted by the spindle drive on the in the direction of the threaded spindle axis of the threaded spindle during the adjustment of the steering column is braced via the holding protrusion or protrusions against the casing unit or support unit.

It is likewise conceivable and possible for the drive unit to have a holding protrusion projecting in the transverse direction, preferably in the area of a bearing segment, which engages with a holding recess of the holding element and/or of the component. The holding protrusion or protrusions on the drive unit, like the above-described holding protrusions on the holding element, serve for fastening the drive unit and for bracing the spindle drive in the direction of the threaded spindle axis against the component of the steering column to which the drive unit is connected.

A ring-shaped spring element designed as a disk spring may be arranged on the holding protrusion. Such a disk spring is a conical or hemispherical ring of spring-elastic material, generally spring steel, which can be compressed in the axial direction like a compression spring. At least one, preferably precisely one disk spring can be mounted on a holding protrusion at the holding element, preferably one configured as a holding pin, so that it is braced by an axial end face against the holding protrusion and rests by its axially opposite end face with spring loading against the drive unit, preferably in the area of a bearing segment. In order to realize a resilient clamping at both faces, a disk spring may additionally be placed on a holding pin at the component connected to the drive unit, which is braced by one end face on the outside against the component and rests by its other end face with spring loading on the inside against the drive unit. The bearing segment is then elastically clamped between the disk springs in transversely displaceable manner.

An alternative design may be realized in that the holding protrusion is resilient. A resilient configuration in the transverse direction may be realized for example by spring elements which are installed in the holding protrusion or integrated in it. In this way, the free end of a holding protrusion projecting from the holding element, the component to which the drive unit is connected, or else the drive unit can be deformed elastically in the transverse direction against the holding element, the component to which the drive unit is connected or correspondingly. The holding protrusion may be realized by an appropriate shaping process, for example by narrow spring tongues, integrally on an otherwise rigid holding element. As a result of the arrangement of one or more resilient holding protrusions, the drive unit can be spring-loaded at one end, or also elastically clamped at both ends.

Alternatively or additionally to the arrangement on the holding element or the component of the steering column to which the drive unit is connected, it may be provided that at least one holding protrusion is arranged on the drive unit. This may be a simple holding pin, on which a preferably ring-shaped spring element is arranged, or also a holding protrusion with an integrated spring element.

The above-described possibilities of exerting a spring force in the transverse direction on the drive unit may be realized individually, or used in combination. Thus, for example, it is conceivable and possible to employ a resilient holding bracket, or a rigid holding bracket with a resilient holding element, a resilient holding protrusion arranged on the outside on the drive unit, or a holding protrusion with mounted ring-shaped spring element on it, individually, or to combine it with corresponding resilient holding arrangements on the oppositely situated inner side between drive unit and the component of the steering column, such as the casing unit or the support unit.

The holding protrusion may be hemispherically convex rounded. The free end face end surface by which a holding protrusion arranged on the holding element or the component rests against the drive unit, or a holding protrusion arranged on the drive unit rests against the holding element or the component, is substantially spherically rounded. In this way, the holding protrusion is given a hemispherical joint head, or is itself formed as a kind of ball head, so that a joint arrangement is realized between the drive unit and the holding element or casing unit. As a result of the spherical or hemispherical rounding, an angle offset from an exactly collinear orientation of the holding protrusions and the mating surfaces or holding recesses interacting with them can be balanced out. The hemispherical holding protrusion may preferably interact with a holding recess formed as a corresponding socket. This can be easily realized in that a holding protrusion shaped as a spherical segment rests against the round circular edge of a holding recess, fashioned as a cylindrical bore. Even in the event of an angle offset, a linear wobble-free bearing between the holding protrusion and the holding recess is preserved. In order to enlarge the bearing surface, the holding recess may be entirely or partially concave, having the same spherical rounding as the holding protrusion, so that the holding recess forms a kind of socket. In this way, a kind of ball joint is formed, in which the holding protrusion can be tilted in the holding recess to balance out an angle offset, preferably to form a swivel axis coinciding with the transverse direction, without impairing the holding effect.

The spherically or hemispherically rounded holding protrusion may be naturally resilient, or resilient as a result of the resilient configuration of the holding element, or else as a result of another spring element acting on the holding element. Alternatively—as described above—a ring-shaped disk spring as the spring element can be arranged coaxially on, i.e., fitted onto the holding protrusion, formed as a holding pin. The disk spring preferably has a conically converging or hemispherically curved cross section, so that it has a smaller diameter at its first end face and a larger diameter at the axially opposite end face. The disk spring is arranged on the holding protrusion such that the converging end with the smaller diameter is oriented in the axial direction of the holding protrusion. In this way, the disk spring surrounds with its smaller diameter the spherically or hemispherically rounded end of the holding protrusion, and is braced resiliently against the there opposite outer side of the bearing segment of the drive unit, or else against the holding element, if the holding protrusion sticks out from the drive unit. This ensures that even when an angle offset is present, the spring element lies with both end faces all around and optimally against the components which are spring-loaded according to the invention in the transverse direction—the holding element, the drive unit and/or the component to which the drive unit is connected.

It is advantageous for the holding element to be a sheet metal part. A sheet metal part may be efficiently fabricated as a punched/pressed/bent piece. As a result of the choice of suitable materials, preferably readily cold formable steel with suitable material properties, for example a holding protrusion or pin can be formed as an integral molding. The holding element can be made naturally resilient as a result of the shaping and the elastic properties. By indenting of edges or crimps, the stability and bending stiffness in another area can be deliberately enhanced. In this way, the number of extra components such as spring elements, holding elements and the like can be reduced, which serves for easier assembly and an efficient fabrication.

In order to connect the drive unit to a component of the steering column which is formed by the support unit, the actuator unit or a casing unit holding the actuator unit and connected to the support unit so that it can swivel about an axis lying in the transverse direction, the axis lying in the transverse direction may extend preferably through the holding element and/or the holding protrusion. In this way, the drive unit can move in linear manner in the transverse direction defined by the holding element and/or the holding protrusion, and be mounted in swiveling manner about the holding element and/or the holding protrusion. This advantageously enlarges the degree of freedom of the drive unit for equalizing of constrained positions. The swivel axis may be formed by the holding element and/or the holding protrusion.

Figure 2:
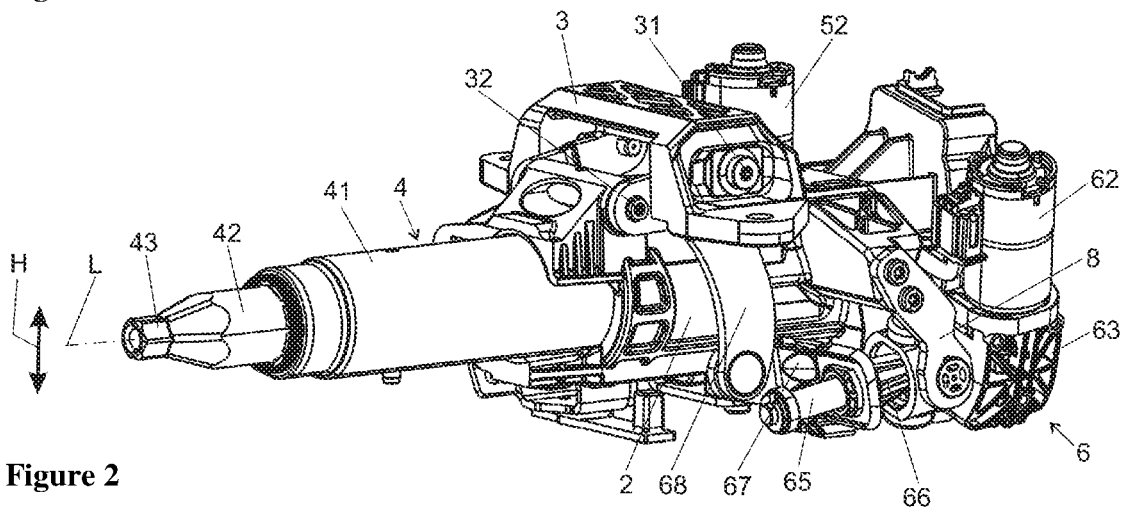
FIG. 2 is a schematic perspective view the steering column of FIG. 1 of the opposite side.

FIGS. 1 and 2 show a steering column 1 according to the invention in schematic perspective views laterally from above, diagonally to the left (FIG. 1) and diagonally to the right (FIG. 2), of the rear end in relation to the driving direction of a vehicle, not shown.

The steering column 1 comprises a casing unit 2, which is attached to a support unit 3 about a swivel axis 31 situated horizontally transversely to the longitudinal axis L, having fastening means 32 formed as bracket pieces for connecting to a motor vehicle body, not shown.

The casing unit 2 holds an actuator unit 4, comprising an inner casing tube 41, in which a steering spindle 42 is mounted rotatably about a longitudinal axis L. At the rear end with respect to the driving direction, the steering spindle 42 is provided with a fastening segment 43 for attachment of a steering wheel, not represented here. The actuator unit 4 is axially telescopically retractable and extensible relative to the casing unit 2 in the direction of the longitudinal axis L, i.e., in the longitudinal direction, as indicated by the double arrow in FIGS. 1 and 2.

An adjusting unit 5 comprises a drive unit 51 with a servomotor 52, which is designed as an electric motor, preferably an electric DC motor, and a gearing 53 coupled to it. In this embodiment, the gearing 53 is designed as a worm gear gearing, wherein a worm is connected in rotationally fixed manner to a rotor shaft of the electric motor, and the worm engages with the toothing of a worm gear, the worm gear being connected in rotationally fixed manner to the threaded spindle 55. The drive unit 51 comprises a bearing segment 54, by which it is mounted according to the invention on the casing unit 2, as will be further discussed in detail below.

From the drive unit 51, a threaded spindle 55 coupled to the output of the gearing 53 can be driven in rotation about its threaded spindle axis R, extending substantially in the direction of the longitudinal axis L. The threaded spindle 55 engages with a spindle nut 56, which is connected firmly to the actuator unit 4 in rotationally fixed manner with respect to the threaded spindle axis R, in the direction of the longitudinal axis L. In this way, a spindle drive is formed, whereby a rotation of the threaded spindle 54 by means of the servomotor 52 results in a displacement of the spindle nut 56 in the direction of the threaded spindle axis R, and the actuator unit 4 connected to the spindle nut 56 is retracted in the direction of the longitudinal axis L into the casing unit 2 or extended out from it, depending on the direction of rotation.

A second adjusting unit 6 is fastened to the casing unit 2 by means of a holding element 8. Like the first adjusting unit 5, the adjusting unit 6 comprises a drive unit 61 with an electric motor 62, a gearing 63, which is likewise formed as a worm gearing, and a rotatably driven threaded spindle 65, which engages with a spindle nut 66. The spindle nut 66 is arranged in rotationally fixed manner at one end of an adjusting lever 67, which by its other end is hinged at a tilting lever 68 to the casing unit 2. The tilting lever 68 is hinged by a first joint 31 to the support unit 3, with the first joint 31 providing for a length equalization. A second joint 32 is provided between the tilting lever 68 and the casing unit 2. By turning of the threaded spindle 65, the spindle nut 66 and with it the adjusting lever 67 and thus the one end of the tilting lever 68 is displaced, so that the casing unit 2 is swiveled relative to the support unit 3 about a swivel axis, wherein the actuator unit 4 together with the casing unit 2 is adjustable in the height direction H relative to the support unit 3, as indicated in FIG. 2 by the double arrow. In this way, a motorized height adjustment of a steering wheel (not shown) attached to the fastening segment 43 is made possible by means of the adjusting unit 6.

Figure 3:
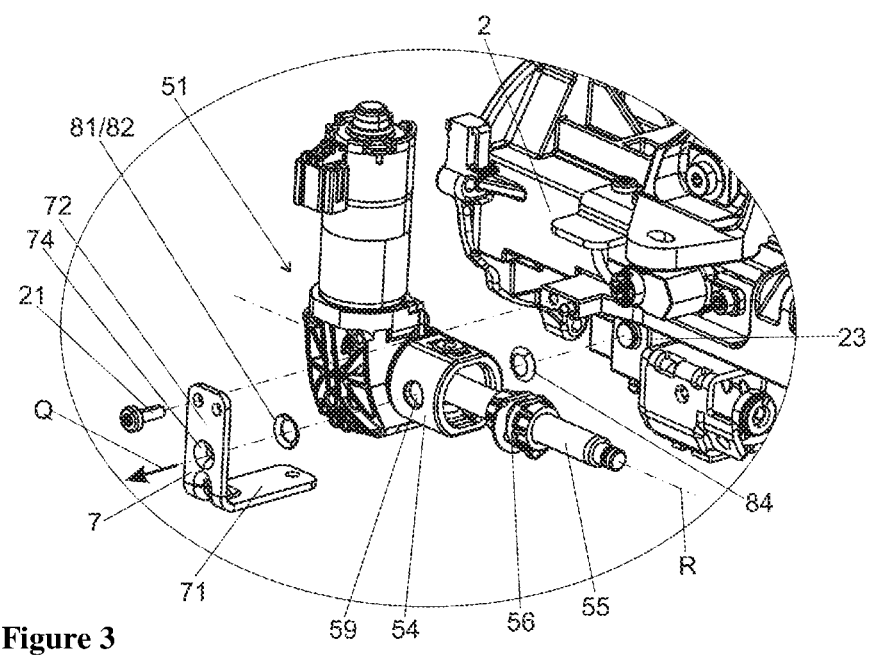
FIG. 3 is a partial view of the steering column of FIG. 1 in a disassembled state.

FIG. 3 shows a detail view of the drive unit 51, which is shown schematically in an exploded view in a transverse direction Q with respect to the threaded spindle axis R and pulled apart and out from the casing unit 2 in this exemplary embodiment with respect to the longitudinal axis L. The casing unit 2 corresponds to the component of the steering column to which the drive unit 51 is connected. The transverse direction Q stands transverse to the threaded spindle axis R and as shown in this exemplary embodiment transverse to the longitudinal axis L, the orientation of the outward transverse direction Q being defined by the arrow in FIG. 3.

Figure 4:
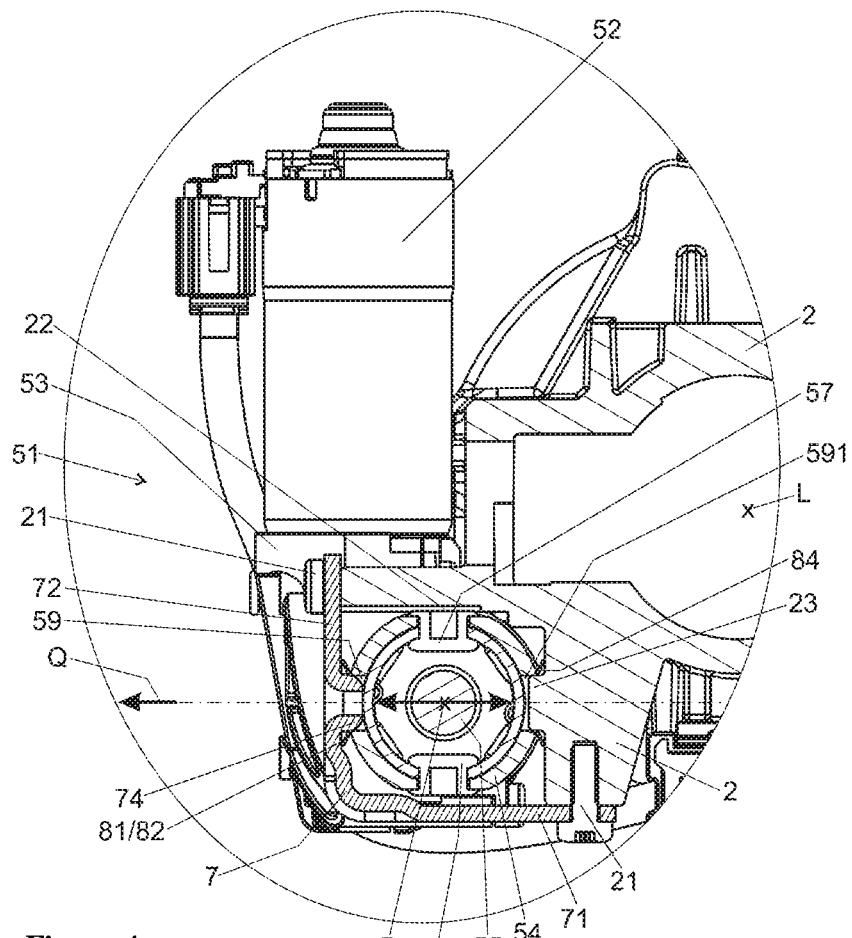
FIG. 4 is a partial view of a cross section transversely to the longitudinal axis through a steering column as per FIGS. 1-3.

An enlarged cross section through the steering column 1 along the transverse direction Q indicated in FIG. 3 is shown in FIG. 4. It can be seen how the drive unit 51 is fastened to the outside of the casing unit 2 (as seen from the longitudinal axis L) at its bearing segment 54 by means of a holding element designed as a holding bracket 7.

The holding bracket 7 is fabricated as an angle-shaped sheet metal part, having a first leg serving as a bearing leg 71 and a holding leg 72 joined to it at an angle. The bearing leg 71 extends parallel to the transverse direction Q and to the threaded spindle axis R of the threaded spindle 55; the holding leg 72 extends transverse to the transverse direction Q and parallel to the threaded spindle axis R. The holding leg 72 encloses the bearing segment 54 on the outside, while the bearing segment 71 braces the bearing segment 54 at the bottom. The holding bracket 7 is secured by means of fastening elements 21, such as screws, to the casing unit 2.

The bearing segment 54 comprises two sliders 57 and 58, which are arranged opposite each other with respect to the threaded spindle axis R, at the top and bottom of the bearing segment 54 in the drawing. The slider 57 rests against a guideway 22 on the casing unit 2, the slider 58 rests against a guideway 73 on the bearing leg 71 of the holding bracket 7. The guideways 22 and 73 run parallel to each other parallel to the transverse direction Q and form a sliding guide for the sliders 57 and 58. The sliders 57, 58 are fashioned as rivet elements, which connect the bearing segment 54 to the gearing housing of the gearing 53. In this way, a sliding bearing is realized, in which the bearing segment 54 and thus the drive unit 51 is mounted able to move in and against the transverse direction Q relative to the casing unit 2, as indicated by the arrows to the left and right of the threaded spindle axis R. The mobility according to the invention of the drive unit 51 is realized by the transversely displaceable mounting, so that this can compensate for the angle offset occurring during an unwanted, yet unavoidable deviation in the parallel orientation of the threaded spindle axis R to the longitudinal axis L due to tolerances, by giving way in the transverse direction Q. In this way, constrained states and a skewing of the threaded spindle 55 relative to the spindle nut 56 can be avoided.

For the holding of the drive unit 51 on the casing unit 2, the bearing segment 54 comprises holding recesses 59 and 591 on opposite sides. A holding pin 23 formed on the casing unit 2 engages with the holding recess 591 facing toward the casing unit 2 in the transverse direction Q, preferably in form-fitting manner or in loose form fit. A holding protrusion 74 directed inward, as per the above definition counter to the transverse direction Q, engages with the opposite holding recess 59 facing outward away from the casing unit 2, and thus facing toward the holding leg 72, likewise in form-fitting manner or in loose form fit. In this way, the drive unit 51 is secured in the longitudinal direction or in the direction of the threaded spindle axis R on the casing unit 2. The holding recesses 59 and 591 may be designed as cylindrical bores, and the holding protrusions 74 and 23 may be designed as cylindrical pins corresponding to the bores.

Different embodiments of the holding protrusion 74 are shown in FIGS. 5 to 9, each of which show enlarged partial views of FIG. 4 in the area of the holding leg 72 of the holding bracket 7.

Figure 5:
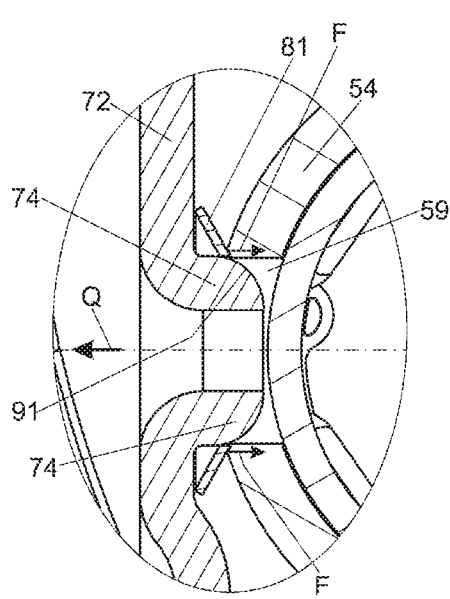
FIG. 5 is an enlarged cutout view of FIG. 4.

In FIG. 5, the holding protrusion 74 is configured as a tubular section projecting inwardly from the holding leg 72 counter to the transverse direction Q, which can be formed for example by a molding of the holding bracket 7, fashioned as a sheet metal part, said molding having been produced by a pressing process.

Figure 6:
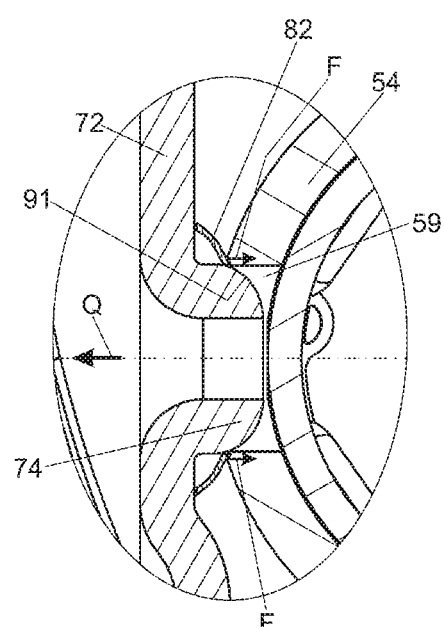
FIG. 6 is an enlarged cutout view as in FIG. 5 of a second embodiment of a steering column.

On the holding protrusion 74 in FIG. 5 there is mounted a spring element in the form of a conical ring-shaped disk spring 81, in FIG. 6 in the form of a hemispherically convex rounded ring-shaped disk spring 82. The disk spring 81, 82 is installed under pretensioning between the holding leg 72 and the bearing segment 54, so that a spring force F, as an elastic pretensioning force, is exerted by the holding leg 72 of the holding element 7 on the bearing segment 54, and accordingly the drive unit 51 is spring-loaded and pretensioned by at least the spring element 81 or 82, and this counter to the transverse direction Q indicated by the arrow. This direction corresponds to the guiding and sliding direction which is dictated by the above-described sliding bearing, which is formed by the sliders 57 and 58 as well as the guideways 22 and 73. As a result of the spring element 81 and 82, the drive unit 51 is pressed elastically inward by the spring force F against the casing unit 2 or in the direction of the longitudinal axis L. In the event of an angle offset between the longitudinal axis L and the threaded spindle axis R of the threaded spindle 55, the bearing segment 54 and thus the overall drive unit 51 can give way against the elastic spring force of the spring element 81 and 82 during the displacement in the transverse direction Q.

Figure 9:
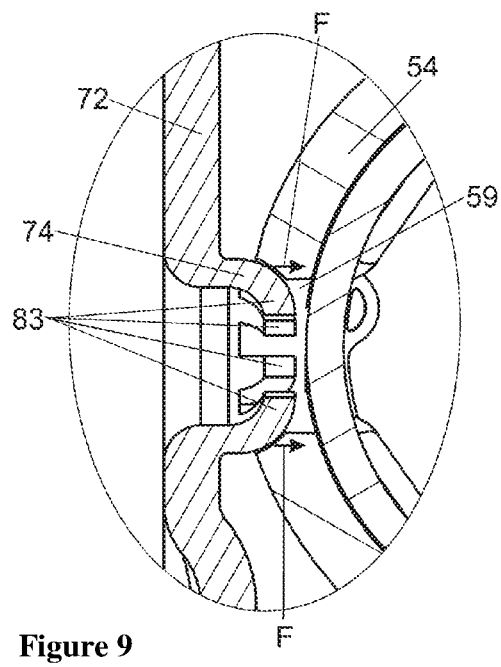
FIG. 9 is an enlarged cutout view as in FIG. 5 of a fifth embodiment of a steering column.

FIG. 9 shows an embodiment in which the holding protrusion 74 is resilient in itself, as a result of a plurality of bending-elastic spring tongues 83 arranged radially in a star pattern and formed as an integral single piece with the wall of the tubular holding protrusion 74. By this arrangement as well, the bearing segment 54 is elastically pretensioned with the spring force F counter to the transverse direction Q.

Figure 10:
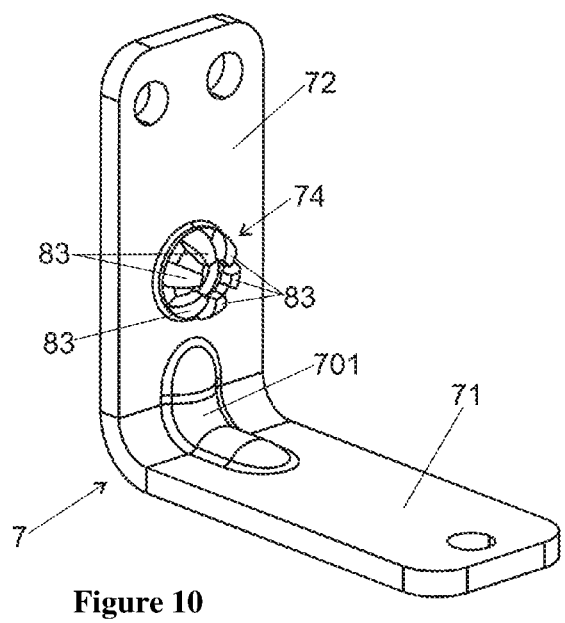
FIG. 10 is a perspective view of a holding element of a steering column as per FIG. 9.

FIG. 10 shows the holding bracket 7 of FIG. 9 with the holding protrusion 74, having resilient holding tongues 83, in a perspective view. It can be seen here that the holding bracket 7 is configured as a single integral sheet metal piece, making it unnecessary to use additional spring elements. The holding tongues 83 consist of the same material as the holding bracket 7, for example steel or spring steel, and can be made by pressing and punching. To stiffen the bend of the holding bracket 7, a reinforcing bead 701 may be provided.

Figure 8:
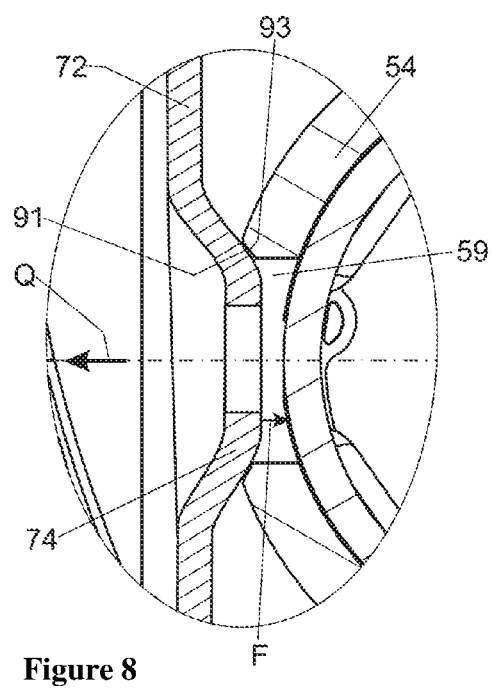
FIG. 8 is an enlarged cutout view as in FIG. 5 of a fourth embodiment of a steering column.

Another option of pretensioning the bearing segment 54 in resilient manner is shown in FIG. 8. Here, the holding leg 72 is naturally bending-elastic and resilient and thus itself exerts the spring force F on the bearing segment 54.

Figure 7:
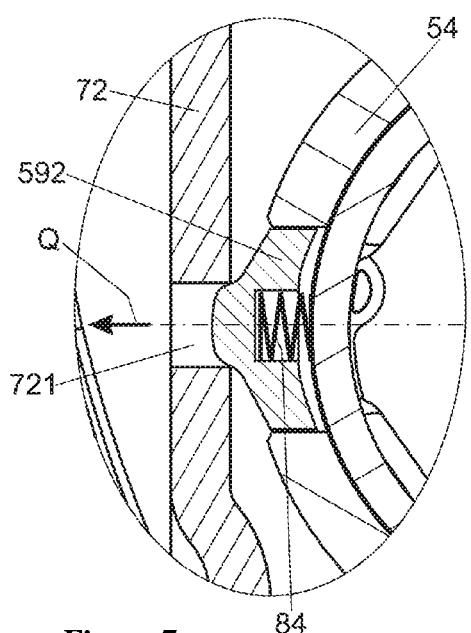
FIG. 7 is an enlarged cutout view as in FIG. 5 of a third embodiment of a steering column.

An alternative option is shown in FIG. 7. Here, the holding leg 72 has a holding recess 721 in the form of a cylindrical bore. A holding protrusion 592 engaging with this holding recess 721 is attached to the bearing segment 54, being transversely pretensioned outwardly against the bearing segment 54 by a spring 84.

In all the embodiments of FIGS. 5 to 10, the drive unit 51 is pretensioned elastically against the casing unit 2, transversely to the longitudinal axis L. The drive unit 51 and thus the threaded spindle 55 can give way to the outside against the spring force F so exerted, in order to equalize tolerances.

In order to allow the drive unit 51 to give way not only transversely to the outside, but also in the opposite direction toward the casing unit 2, a second spring element 84 can be arranged between the bearing segment 54 and the casing unit 2, as can be seen in FIG. 4. This spring element 84 may be fashioned as a ring-shaped disk spring, which is mounted on the holding pin 23 of the casing unit 2. The bearing segment 54 is then clamped in and against the transverse direction Q resiliently between this second spring element 84 and the spring element 81, 82 or 83 realized in the particular embodiment or the naturally resilient holding leg 72.

In order to equalize any axial offset caused by tolerances between the holding protrusion 74 or 592 and the oppositely situated holding pin 23, the holding protrusion 74 or 592 may have a spherical or conical convex rounded area 91 at its free end face, so that a kind of conical or spherical joint head or ball joint head is formed. With the convex area 91, the holding protrusion 74 or 592 engages with the associated holding recess 59 or 721. In the embodiments of FIGS. 5 and 6, the convex area 91 rests in linear manner against the edge of the holding recess 59; in the embodiment of FIG. 7, it lies against the edge of the holding recess 721.

In order to enlarge the bearing area, a concave indentation 93 may be formed at the edge of the holding recess 59, being adapted to the convex area 91 on the holding protrusion 74 to form a ball joint type arrangement.

As a result of the convex area on the holding protrusion 74 or 592, a joint arrangement is formed in conjunction with the edge of the holding recess 59 or 721, or a concave indentation 93 formed at the edge of the holding recess 59, with which axial offset can be equalized, thereby improving the holding effect.

Figure 11:
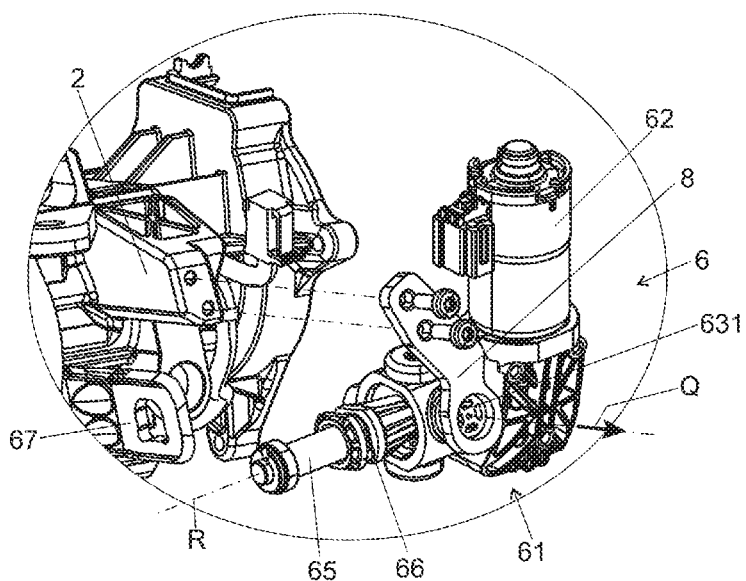
FIG. 11 is a partial view of the steering column of FIG. 2 in disassembled state.

FIG. 11 shows a partial view of the steering column of FIG. 2 in disassembled state. The drive unit 61 of the second adjusting unit 6 is fastened to the casing unit 2 by the holding element 8, which is shown in an exploded view schematically in a transverse direction Q with respect to the threaded spindle axis R and pulled out from the casing unit 2. The casing unit 2 corresponds to the component of the steering column 1 to which the drive unit 61 is connected. The transverse direction Q stands transverse to the threaded spindle axis R, while the orientation of the transverse direction Q to the outside is defined by the arrow in FIG. 11. The holding element 8 is secured by fastening means to the casing unit 2. The holding element 8 takes up a bolt-shaped protrusion 631 of the drive unit 61 pivotably about an axis in the direction of the transverse direction Q. The holding element 8 is a spring configured as a leaf spring, in order to allow a movement of the drive unit 61 in the transverse direction Q transversely to the threaded spindle axis R of the threaded spindle 65. Alternatively or additionally, spring elements may be provided on the bolt-shaped protrusion 631, which pretension the drive unit 61 against the holding element in the direction of the transverse direction Q.

Figure 12:
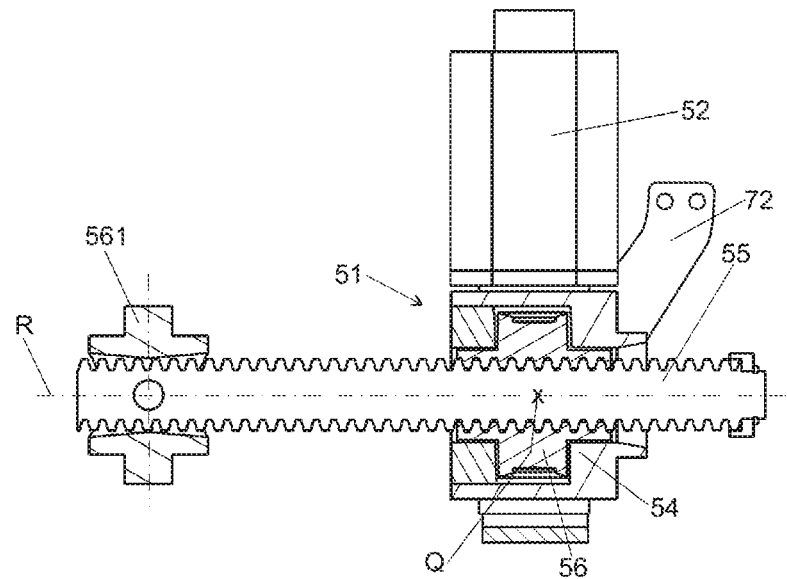
FIG. 12 is a longitudinal sectional view of an adjusting unit in an alternative embodiment with a threaded spindle movable in translation.
Figure 13:
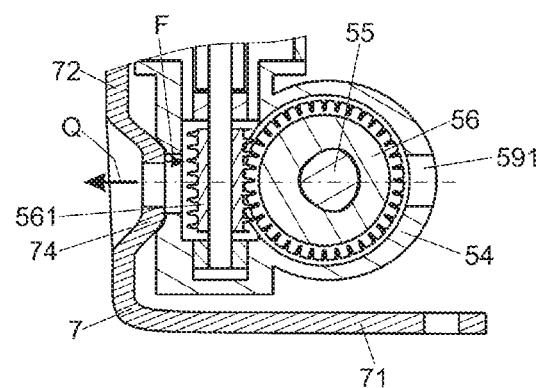
FIG. 13 is a partial view of the adjusting unit of FIG. 12 in a cross section.

FIGS. 12 and 13 show an alternative embodiment of the first adjusting unit 5. Here, the adjusting unit 5 comprises an electric servomotor 52 and a drive unit 51. The holding element 7 for connecting the drive unit 51 to the casing unit 2 corresponds to the one in FIG. 8. In this holding element, the holding leg 72 is elastically resilient in itself and thus itself exerts the spring force F on the bearing segment 54. The drive unit 51 of FIGS. 12 and 13 comprises a threaded spindle 55 displaceable in translation in the direction of the threaded spindle axis R. The threaded spindle 55 engages with the worm gear 56, drivable by a worm 561. As a result of the rotation of the worm gear 56, the threaded spindle 55 is moved in translation in the direction of the threaded spindle axis R. The actuator unit 4, connected to the threaded spindle 55 via the connecting part 561, is adjusted by the translatory movement of the threaded spindle 55 relative to the support unit 3. The alternative embodiment of the first adjusting unit 5 represented in FIGS. 12 and 13 may also be applied analogously to the second adjusting unit 6 and is thus also suited to the realizing of a height adjustment.

LIST OF REFERENCE NUMBERS

1 Steering column
2 Casing unit
21 Fastening elements
22 Guideway
23 Holding pin
3 Support unit
31 Swivel axis
32 Fastening means
4 Actuator unit
41 Casing tube
42 Steering spindle
43 Fastening segment
5, 6 Adjusting unit
51, 61 Drive unit
52, 62 Servomotor
53, 63 Gearing
54 Bearing segment
55, 65 Threaded spindle
56, 66 Spindle nut
57, 58 Sliders
59, 591 Holding recess
592 Holding protrusion
67 Adjusting lever
7 Holding bracket
71 Bearing leg
72 Holding leg
721 Holding recess
73 Guideway
74 Holding protrusion
81, 82 Disk spring
83 Spring tongue
91 Convex area
93 Concave indentation
L Longitudinal axis
H Height direction
Q Transverse direction
F Spring force

What is claimed is:

1. A motor-adjustable steering column for a motor vehicle, comprising:
a support unit, which is configured to mount on a vehicle body,
an actuator unit held by the support unit,
a steering spindle rotatably mounted in the actuator unit about a longitudinal axis,
an adjusting drive connected to the support unit and to the actuator unit, and configured such that the actuator unit is adjustable relative to the support unit,
wherein the adjusting drive comprises a drive unit and a threaded spindle engaging in a spindle nut and having a threaded spindle axis, wherein the threaded spindle is driven in rotation or in translation by the drive unit, and
wherein the drive unit is connected to a component of the steering column which is formed by the support unit, the actuator unit or a casing unit holding the actuator unit and connected to the support unit, such that the drive unit is movable in a direction transverse to the threaded spindle axis.

2. The steering column of claim 1, wherein the drive unit is displaceable in a linear manner relative to the component substantially transversely to the threaded spindle axis and transversely to the longitudinal axis.

3. The steering column of claim 1, wherein the drive unit is spring-loaded by at least one spring element.

4. The steering column of claim 1, wherein a holding element is arranged on the component, against which element the drive unit is braced at least in the transverse direction.

5. The steering column of claim 4, wherein at least one spring element is arranged between the holding element and the drive unit and/or between the drive unit and the component.

6. The steering column of claim 4, wherein the holding element is configured as a spring-elastic holding bracket.

7. The steering column of claim 6, wherein the holding element and/or the component comprises a holding protrusion which engages with a holding recess of the drive unit.

8. The steering column of claim 7, wherein a ring-shaped spring element is arranged on the holding protrusion.

9. The steering column of claim 7, wherein the holding protrusion is resilient.

10. The steering column of claim 7, wherein at least one holding protrusion is arranged on the drive unit.

11. The steering column of claim 7, wherein the holding protrusion is convex rounded.

12. The steering column of claim 6, wherein the holding element is a sheet metal part.

13. The steering column of claim 6, wherein the axis lying in the transverse direction extends through the holding element and/or the holding protrusion.

14. A motor-adjustable steering column for a motor vehicle, comprising:
- a support unit configured to be mounted on a vehicle body,
- an actuator unit held by the support unit,
- a steering spindle rotatably mounted in the actuator unit about a longitudinal axis,
- an adjusting drive connected to the support unit and to the actuator unit, and configured such that the actuator unit is adjustable relative to the support unit,
- wherein the adjusting drive comprises a drive unit and a threaded spindle engaging in a spindle nut and having a threaded spindle axis, wherein the threaded spindle is driven in rotation or in translation by the drive unit,
- wherein the drive unit is connected to a component of the steering column which is formed by the support unit, the actuator unit or a casing unit holding the actuator unit and connected to the support unit, such that it swivels about an axis lying in a transverse direction.

15. The steering column of claim 14, wherein the drive unit is displaceable in a linear manner relative to the component substantially transversely to the threaded spindle axis and transversely to the longitudinal axis.

16. The steering column of claim 14, wherein the drive unit is spring-loaded by at least one spring element.

17. The steering column of claim 14, wherein a holding element is arranged on the component, against which element the drive unit is braced at least in the transverse direction.

* * * * *